United States Patent
Menon et al.

(10) Patent No.: US 12,552,455 B2
(45) Date of Patent: Feb. 17, 2026

(54) SYSTEMS AND METHODS FOR CALIBRATING A VEHICLE STEERING ANGLE BY LEVERAGING A STEERING PINION ANGLE OFFSET AND A WHEEL ALIGNMENT FUNNEL

(71) Applicant: Ford Motor Company, Dearborn, MI (US)

(72) Inventors: Meghna Menon, Ann Arbor, MI (US); Mario Anthony Santillo, Canton, MI (US); Gregory P. Linkowski, Dearborn, MI (US); Krishna Bandi, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 271 days.

(21) Appl. No.: 18/518,107

(22) Filed: Nov. 22, 2023

(65) Prior Publication Data

US 2024/0182112 A1 Jun. 6, 2024

Related U.S. Application Data

(60) Provisional application No. 63/430,502, filed on Dec. 6, 2022.

(51) Int. Cl.
*G01B 21/26* (2006.01)
*B62D 15/02* (2006.01)
(52) U.S. Cl.
CPC ......... *B62D 15/0245* (2013.01); *G01B 21/26* (2013.01)
(58) Field of Classification Search
CPC .............. G01B 2210/26; G01B 11/275; G01B 11/2755; G01B 21/26; B62D 15/0245

USPC ........................................................ 701/41
See application file for complete search history.

(56) References Cited

U.S. PATENT DOCUMENTS

| | | | | |
|---|---|---|---|---|
| 4,383,370 A * | 5/1983 | Van Blerk | .............. | G01B 7/315 33/336 |
| 5,208,646 A * | 5/1993 | Rogers | ............... | G01B 11/2755 356/139.09 |
| 6,098,296 A * | 8/2000 | Perisho, Jr. | ............ | G01B 21/26 701/34.3 |
| 2004/0167693 A1* | 8/2004 | Yao | ........................ | B62D 5/001 180/443 |

(Continued)

*Primary Examiner* — Logan M Kraft
*Assistant Examiner* — Joshua Campbell
(74) *Attorney, Agent, or Firm* — Burris Law, PLLC

(57) ABSTRACT

A system for calibrating a vehicle includes a funnel-type wheel alignment system and an infrastructure system. The infrastructure system is configured to autonomously control a movement of the vehicle within the funnel-type wheel alignment system based on an autonomous marshaling routine and selectively adjust one or more parameters of the autonomous marshaling routine based on one or more calibration metrics generated by the funnel-type wheel alignment system. The funnel-type wheel alignment system is configured to: obtain steering wheel angle data from one or more vehicle sensors, determine a vehicle steering pinion angle offset based on the steering wheel angle data, perform a physical alignment of one or more wheels of the vehicle as the vehicle moves through the funnel-type wheel alignment system, generate the one or more calibration metrics based on the vehicle steering pinion angle offset and the physical alignment, and broadcast the one or more calibration metrics.

20 Claims, 5 Drawing Sheets

(56) References Cited

U.S. PATENT DOCUMENTS

| | | | |
|---|---|---|---|
| 2015/0049199 A1* | 2/2015 | Rogers | H04N 23/698 |
| | | | 348/148 |
| 2019/0063913 A1* | 2/2019 | Leone | B60K 28/10 |
| 2020/0049499 A1* | 2/2020 | Jammoussi | G01B 21/24 |
| 2021/0387637 A1* | 12/2021 | Rogers | G01B 11/2755 |
| 2023/0145508 A1 | 5/2023 | Kaphengst et al. | |

* cited by examiner

SYSTEMS AND METHODS FOR CALIBRATING A VEHICLE STEERING ANGLE BY LEVERAGING A STEERING PINION ANGLE OFFSET AND A WHEEL ALIGNMENT FUNNEL

CROSS-REFERENCE TO RELATED APPLICATION

This application claims the benefit of and priority to U.S. Provisional Application No. 63/430,502, filed on Dec. 6, 2022, and titled "SYSTEMS AND METHODS FOR CALIBRATING A VEHICLE STEERING ANGLE BY LEVERAGING A STEERING PINION ANGLE OFFSET AND A WHEEL ALIGNMENT FUNNEL", the contents of which are incorporated herein by reference in its entirety.

FIELD

The present disclosure relates to systems and methods for calibrating a vehicle steering angle.

BACKGROUND

The statements in this section merely provide background information related to the present disclosure and may not constitute prior art.

In a manufacturing environment, vehicles may perform automated vehicle marshaling routines (e.g., an autonomous navigation routine) between various end-of-line (EOL) processes, which may be performed at different stations. An infrastructure system monitors and tracks the location, trajectory, and/or pose of the vehicle during marshaling. The automated vehicle marshaling routines can employ automated steering features after the vehicle tires and wheels are installed. Accordingly, automated steering features may be calibrated prior to navigating to one or more of the EOL processes. However, when the vehicle has large steering-gear ratios, one or more cascaded errors, such as part variability and installation variances, can result in offsets among different vehicles.

Calibration processes currently used, such as performed with a dynamometer, by an extended calibration process (e.g., requiring the vehicle to be driven straight for a longer period), and/or by a wheel-alignment station, can be time consuming and inhibit the implementation of automated manufacturing systems. The present disclosure addresses these and other issues related to the calibration of a steering angle offset.

SUMMARY

This section provides a general summary of the disclosure and is not a comprehensive disclosure of its full scope or all of its features.

The present disclosure provides a system comprising: a funnel-type wheel alignment system; and an infrastructure system, wherein: the infrastructure system is configured to: autonomously control a movement of the vehicle within the funnel-type wheel alignment system based on an autonomous marshaling routine; and selectively adjust one or more parameters of the autonomous marshaling routine based on one or more calibration metrics generated by the funnel-type wheel alignment system; and the funnel-type wheel alignment system is configured to: obtain steering wheel angle data from one or more vehicle sensors of the vehicle; determine a vehicle steering pinion angle offset based on the steering wheel angle data; perform a physical alignment of one or more wheels of the vehicle as the vehicle moves through the funnel-type wheel alignment system; generate the one or more calibration metrics based on the vehicle steering pinion angle offset and the physical alignment; and broadcast the one or more calibration metrics to the infrastructure system; wherein the funnel-type wheel alignment system is further configured to transmit information relating to the vehicle steering pinion angle offset to an advanced driver assistance system (ADAS) onboard the vehicle to identify a center of rack travel; wherein the vehicle steering pinion angle offset is determined while power steering of the vehicle is engaged, and the ADAS determines a deviation from the center of rack travel to perform coarse calibration; wherein the vehicle steering pinion angle offset is averaged over time as the vehicle moves to converge the steering pinion angle offset to a nominal value; wherein steering wheel angle coarse calibration information from the coarse calibration and toe information for the vehicle are stored in the ADAS and transmitted to the infrastructure system, wherein the infrastructure system is further configured to use the transmitted information to control maneuvering of the vehicle including adjusting one or more autonomous marshaling routines; wherein steering wheel angle coarse calibration information from the coarse calibration and toe information for the vehicle are stored in the ADAS and transmitted to a wheel alignment and headlamp aim system for use in manual alignment; wherein the vehicle transmits a raw vehicle steering pinion angle offset signal to the ADAS to compute a nominal calibration offset value; and wherein the funnel-type wheel alignment system is further configured to perform the physical alignment of the one or more wheels of the vehicle by simultaneously aligning the one or more wheels of the vehicle.

The present disclosure also provides a method comprising: controlling autonomous movement of a vehicle within a wheel alignment system based on an autonomous marshaling routine; obtaining steering wheel angle data from one or more vehicle sensors of the vehicle; determining a vehicle steering pinion angle offset based on the steering wheel angle data; performing a physical alignment of one or more wheels of the vehicle as the vehicle moves through the wheel alignment system; generating one or more calibration metrics based on the vehicle steering pinion angle offset and the physical alignment; and selectively adjusting one or more parameters of the autonomous marshaling routine based on one or more calibration metrics generated by the wheel alignment system; further comprising transmitting information relating to the vehicle steering pinion angle offset to an advanced driver assistance system (ADAS) onboard the vehicle to identify a center of rack travel; wherein the vehicle steering pinion angle offset is determined while power steering of the vehicle is engaged, and the ADAS determines a deviation from the center of rack travel to perform coarse calibration; wherein the vehicle steering pinion angle offset is averaged over time as the vehicle moves to converge the steering pinion angle offset to a nominal value; further comprising storing steering wheel angle coarse calibration information from the coarse calibration and toe information for the vehicle in the ADAS and using the transmitted information to control maneuvering of the vehicle including adjusting one or more autonomous marshaling routines; further comprising storing the steering wheel angle coarse calibration information from the coarse calibration and toe information for the vehicle in the ADAS and transmitting the information to a wheel alignment and headlamp aim system for use in manual alignment; wherein the vehicle transmits a raw vehicle steering pinion angle offset signal to the ADAS to compute a nominal calibration offset value; wherein the wheel alignment system comprises a funnel-type wheel alignment system and further comprising performing the physical alignment of the one or more wheels of the vehicle by simultaneously aligning the one or more wheels of the vehicle.

The present disclosure further provides one or more non-transitory computer-readable media storing processor-executable instructions that, when executed by at least one processor, cause the at least one processor to: control, by an infrastructure system, autonomous movement of a vehicle within a wheel alignment system based on an autonomous marshaling routine; obtain steering wheel angle data from one or more vehicle sensors of the vehicle; determine, by the wheel alignment system, a vehicle steering pinion angle offset based on the steering wheel angle data; perform, by the wheel alignment system, a physical alignment of one or more wheels of the vehicle as the vehicle moves through the wheel alignment system; generate, by the wheel alignment system, one or more calibration metrics based on the vehicle steering pinion angle offset and the physical alignment; broadcast the one or more calibration metrics to the infrastructure system; and selectively adjust, by the infrastructure system, one or more parameters of the autonomous marshaling routine based on one or more calibration metrics generated by the wheel alignment system; wherein the wheel alignment system comprises a funnel-type wheel alignment system and the processor-executable instructions, when executed by the at least one processor, cause the funnel-type wheel alignment system to transmit information relating to the vehicle steering pinion angle offset to an advanced driver assistance system (ADAS) onboard the vehicle to identify a center of rack travel, wherein the vehicle steering pinion angle offset is determined while power steering of the vehicle is engaged, and the ADAS determines a deviation from the center of rack travel to perform coarse calibration; wherein the vehicle steering pinion angle offset is averaged over time as the vehicle moves to converge the steering pinion angle offset to a nominal value; and wherein the processor-executable instructions, when executed by the at least one processor, cause the vehicle to store steering wheel angle coarse calibration information from the coarse calibration and toe information for the vehicle in the ADAS and transmit the information to the infrastructure system, and cause the infrastructure system to use the transmitted information to control maneuvering of the vehicle including adjusting one or more autonomous marshaling routines.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
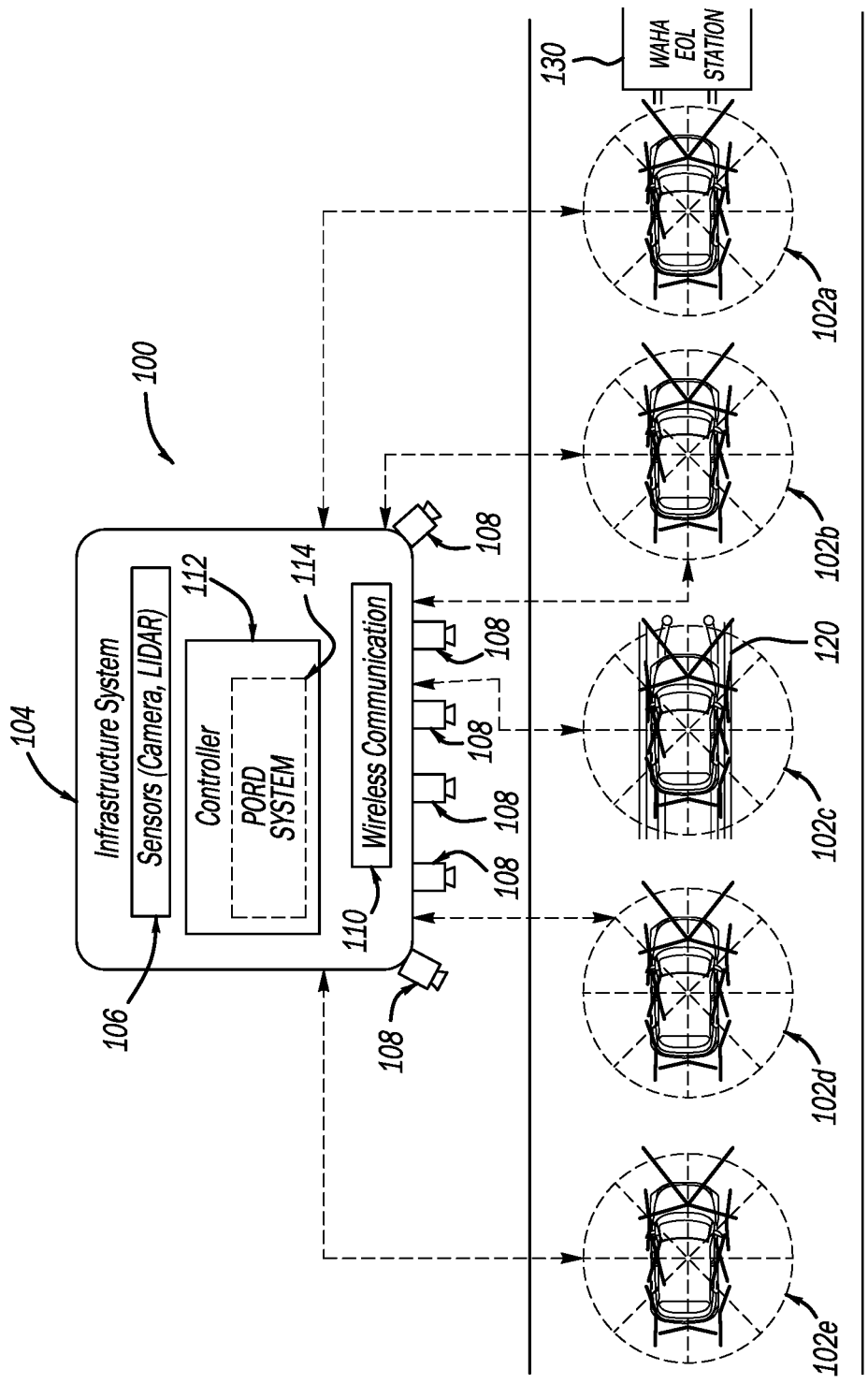
FIG. 1 illustrates a system for distribution of a fleet of vehicles in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, "AVM" refers to automated vehicle marshaling; "SWA" refers to a steering wheel angle; "SPAO" refers to a steering pinion angle offset; "EOL test" refers to an end-of-line test; "WAHA" refers to a wheel-alignment-headlamp-aim; and "toe" refers to an angular direction of the wheels.

One or more herein described examples provide a means for wheel alignment of one or more vehicles with the communication between any of the one or more vehicles and an infrastructure utilized to marshal the one or more vehicles to various waypoints. It is understood that the marshaling of the one or more vehicles, by the infrastructure, is automated. With the inclusion of automated vehicle marshaling into a manufacturing end-of-line process, the one or more vehicles automatically maneuver between one or more calibration stations without the aid of a human driver by using sensors mounted in a factory infrastructure. The sensors are used to provide real-time accurate vehicle localization along with wireless communication between the infrastructure and the one or more vehicles for closed-loop control.

To be able to implement the automated marshaling system within the factory infrastructure, the automated vehicle marshaling is operable to enable automated steering immediately at the end-of-line, after vehicle tires and wheels have been installed. Waiting for a full steering-angle offset calibration procedure to be performed at a wheel-alignment workstation, that is downstream from the tire and wheel installation workstation, is not desirable in an automated marshaling system. Therefore, steering-angle offset calibration processes for wheel alignment (which is coarse wheel alignment in various examples), in one or more examples, is performed immediately at the end-of-line as is described herein.

More particularly, one or more herein described examples provide systems and methods for aligning the wheels of a vehicle and estimating a steering wheel angle of the vehicle upon installation of the tires. More specifically, some examples of systems and methods employ a funnel-type mechanism in combination with previously acquired calibrated raw information associated with a steering pinion angle offset of the vehicle to align the wheels (e.g., perform an initial coarse wheel alignment at the EOL when wheels are installed and before being maneuvered to a WAHA station). As such, the systems and methods for aligning the wheels and estimating the steering wheel angle increase the accuracy of wheel alignment and steering wheel angle prediction, while at least maintaining current cycle times of the manufacturing environment compared to conventional wheel alignment calibration routines.

Referring now to FIG. 1, there is shown a system 100 (e.g., an automated vehicle marshaling (AVM) system) for the distribution of autonomous and semi-autonomous vehicles 102 (e.g., one or more vehicles 102a-102e) for example, situated in a factory floor. The system 100 includes an infrastructure system 104. The infrastructure system 104 further includes a sensor component 106 (also referred to as the infrastructure sensor component 106) that communicates with a set of infrastructure sensors 108 such as, for example, one or more cameras, lidar, radar, and/or ultrasonic devices. The sensors 108 monitor the movement of the vehicles 102 as the vehicles 102 move through, for example, the factory floor. The infrastructure system 104 also includes a wireless communication component 110 that provides for communication between the infrastructure system 104 and the vehicles 102. Additionally, the infrastructure system 104 includes an infrastructure controller 112. The infrastructure controller 112 is configured to centrally control the operation of each of the vehicles 102. For example, the operation of each of the vehicles 102 includes propulsion, braking, and steering of the vehicles 102. It is understood that the infrastructure controller 112 may be disposed within the infrastructure system 104 or externally located relative to the infrastructure system 104.

The infrastructure controller 112 includes a vehicle pose, obstacle, and routing data system (hereinafter referred to as "the vehicle PORD system") 114 that is used in some examples to facilitate performing steering angle calibration. The infrastructure controller 112 is configured to also facilitate communication of information between the infrastructure controller 112 with a vehicle controller 200 associated with each of the vehicles 102 and a wheel alignment system 120 (e.g., a funnel-type wheel alignment system).

Figure 2:
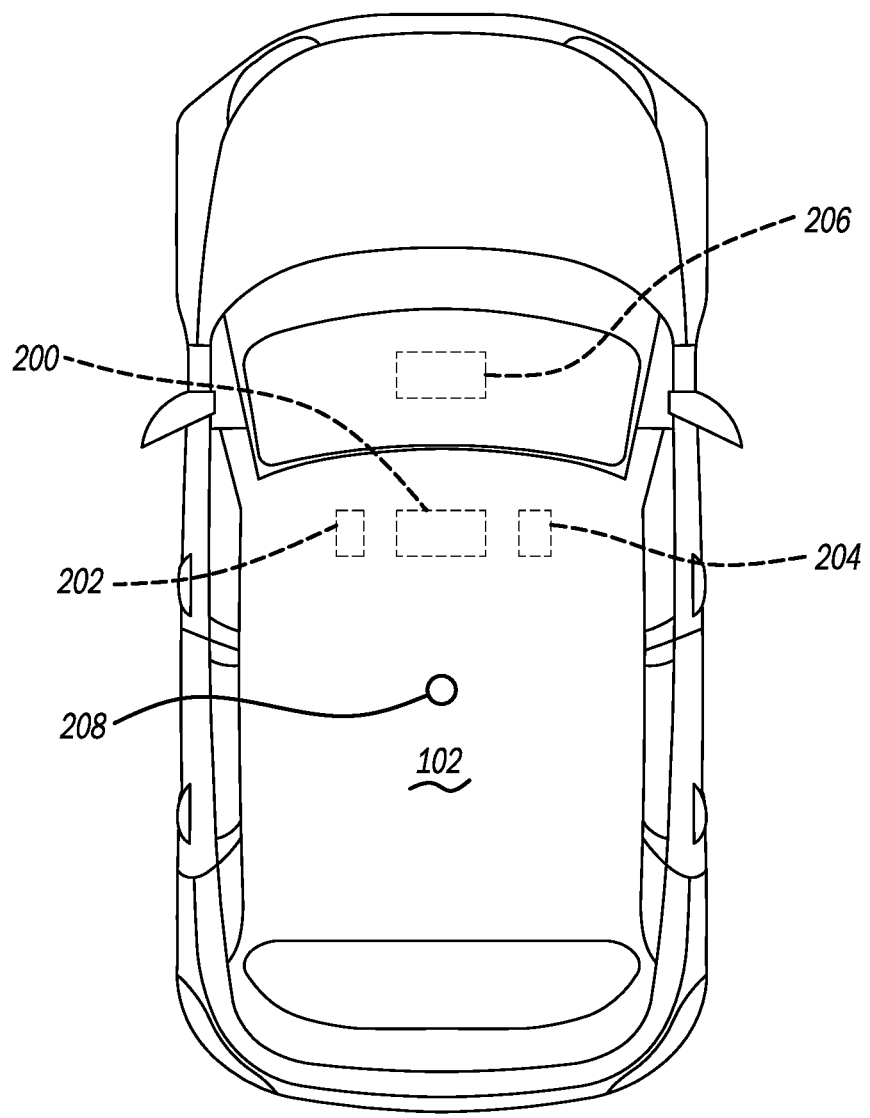
FIG. 2 illustrates an example vehicle distributed by the system shown in FIG. 1 in accordance with various implementations.

Referring further to FIG. 2 (and with continued reference to FIG. 1), in various forms, the vehicles 102 may be powered in a variety of ways, for example, with an electric motor and/or an internal combustion engine. The vehicles 102 may be any type of vehicle powered by an electric motor and/or an internal combustion engine such as a car, a truck, a robot, a plane and/or a boat, as non-limiting examples. Each of the vehicles 102 include a vehicle controller 200, one or more actuators 202, a plurality of on-board sensors 204, and a human machine interface (HMI) 206. Each of the one or more vehicles 102a-102e also have a reference point 208, that is, a specified point within the space defined by a vehicle body, for example, a geometrical center point at which respective longitudinal and lateral center axes of a particular vehicle of the one or more vehicles 102a-102e intersect. The reference point 208 identifies the location of the particular vehicle of the one or more vehicles 102a-102e, for example, a point at which the vehicles 102 are located as the vehicles 102 navigate toward a waypoint.

The vehicle controller 200, in some examples, is configured or programmed to control the operation of the one or more vehicle 102a-102e brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle controller 200, as opposed to a human operator, is to control such operations. It is understood that any of the operations associated with the vehicles 102 may be facilitated via an automated, a semi-automated, or a manual mode. For example, the automated mode may facilitate for any of the operations to be fully controlled by the vehicle controller 200 without the aid of a user. As another example, the semi-automated mode may facilitate for any of the operations to be at least partially controlled by the vehicle controller 200 and/or the user. As a further example, the manual mode may facilitate for any of the operations to be fully controlled by the user.

The vehicle controller 200 includes or may be communicatively coupled to (e.g., via a vehicle communications bus) one or more processors, for example, controllers or the like included in the vehicles 102 for monitoring and/or controlling various vehicle controllers, such as a powertrain controller, a brake controller, a steering controller, etc. The vehicle controller 200 is generally arranged for communications on a vehicle communication network that can include a bus in the vehicle 102 such as a controller area network (CAN) or the like, and/or other wired and/or wireless mechanisms.

The vehicle controller 200 transmits messages, via a vehicle network, to various devices in the vehicles 102 and/or receives messages from the various devices, for example, the one or more actuators 202, the HMI 206, etc. Alternatively, or additionally, in cases where the vehicle controller 200 includes multiple devices, the vehicle communication network is utilized for communications between devices represented as the vehicle controller 200 in this disclosure. Further, as discussed below, various other controllers and/or sensors provide data to the vehicle controller 200 via the vehicle communication network.

In addition, the vehicle controller 200 is configured for communicating through a wireless vehicular communication interface with other traffic objects (e.g., vehicles, infrastructures, pedestrians, etc.), such as, via a vehicle-to-vehicle communication network. The vehicle controller 200 is also configured for communicating through a vehicle-to-infrastructure communication network, such as communicating with the infrastructure controller 112 of the infrastructure system 104. The vehicular communication network represents one or more mechanisms by which the vehicle controller 200 of the vehicles 102 communicate with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 202 are implemented via circuits, chips, or other electronic and/or mechanical components that can actuate various vehicle subsystems in accordance with appropriate control signals. The actuators 202 may be used to control braking, acceleration, and/or steering of the vehicles 102. The vehicle controller 200 can be programmed to actuate the vehicle actuators 202 including propulsion, steering, and/or braking based on the planned acceleration or deceleration of the vehicles 102.

The sensors 204 include a variety of devices to provide data to the vehicle controller 200. For example, the sensors 204 may include object detection sensors such as lidar sensor(s) disposed on or in the vehicles 102 that provide relative locations, sizes, and shapes of one or more targets surrounding the vehicles 102, for example, additional vehicles, bicycles, pedestrians, robots, drones, etc., traveling next to, ahead, and/or behind the vehicles 102. As another example, one or more of the sensors can be radar sensors affixed to one or more bumpers of the vehicles 102 that may provide locations of the target(s) relative to the location of each of the vehicles 102.

The object detection sensors may include a camera sensor, for example, to provide a front view, side view, rear view, etc., providing images from an area surrounding the vehicles 102. For example, the vehicle controller 200 may be programmed to receive sensor data from a camera sensor(s) and to implement image processing techniques to detect a road, infrastructure elements, etc. The vehicle controller 200 may be further programmed to determine a current vehicle location based on location coordinates, for example, GPS coordinates, received from the vehicles 102 and indicative of a location of the vehicles' 102 location from a GPS sensor.

The HMI 206 is configured to receive information from a user, such as a human operator, during operation of the vehicles 102. Moreover, the HMI 206 is configured to present information to the user, such as, an occupant of one or more of the vehicles 102. In some variations, the vehicle controller 200 is programmed to receive destination data, for example, location coordinates, from the HMI 206.

Accordingly, the vehicles 102 can be autonomously guided toward a waypoint using a combination of the infrastructure sensors 108 and the vehicle sensors (e.g., the onboard sensors 204). Routing can be done using vehicle location, distance to travel, queue in line for vehicle marshaling, etc. Vehicles 102 requiring additional charge/fuel can be prepped ahead of joining the queue. Other vehicles 102 destined to a particular waypoint operate in the same way, so that movement of an entire fleet can be coordinated. The movements of the entire fleet are coordinated through a central fleet-management system that directs all traffic and logistics from an assembly plant to the waypoint. For example, the entire fleet can be organized in a pre-sorted order.

The centralized fleet-management application in various examples has complete knowledge of the vehicles 102 in its control (for example, current location, destination, special notes, etc.), which adds accountability and traceability to the distribution process. The fleet-management is coordinated within and/or across sites to optimize delivery timing of each of the one or more vehicles 102a-102e to the waypoint. Several logistics applications can be used, which may involve a combination of an infrastructure system integrated with a traffic-management algorithm to queue and deconflict vehicles in real-time. Accordingly, the fleet-management application queues vehicles 102 based on unique characteristics (how far does a particular vehicle of the one or more vehicles 102a-102e need to travel, what traffic is along the route, when does the particular vehicle of the one or more vehicles 102a-102e need to get to a particular location to line up in the correct order, etc.).

Figure 3:
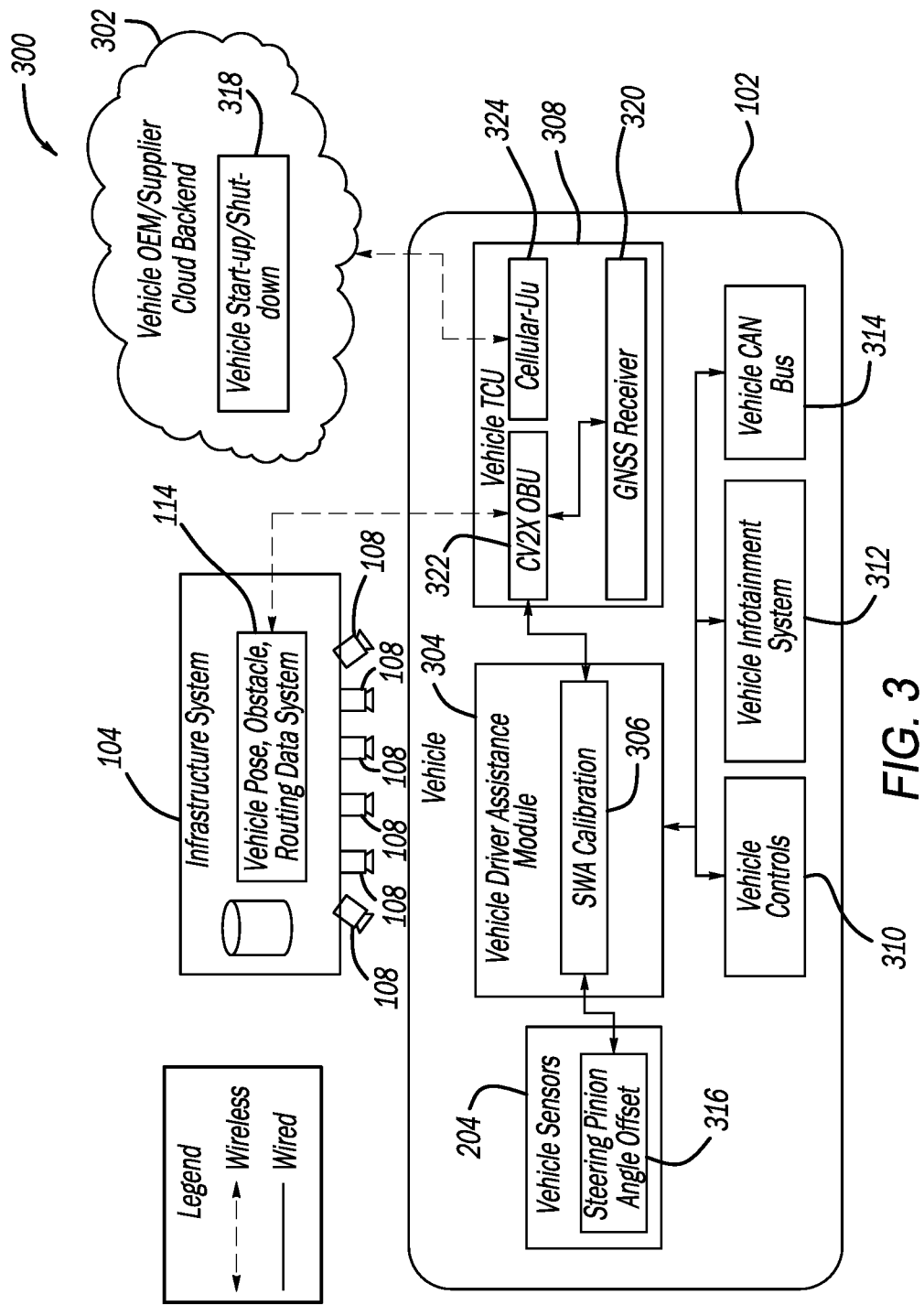
FIG. 3 is a block diagram of a manufacturing environment in accordance with the various implementations.

Referring to FIG. 3 (and with continued reference to FIG. 1), a manufacturing environment 300 includes the infrastructure system 104, a vehicle manufacturing original equipment manufacturer (OEM)/supplier cloud backend 302 (hereinafter referred to as "the cloud"), and the vehicle 102. The infrastructure system 104, the cloud 302, and the vehicle 102 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others) in various examples. Any one of the components of the infrastructure system 104, the cloud 302, and the vehicle 102 may be provided at the same or different locations (e.g., one or more edge computing devices).

The infrastructure system includes the PORD system 114, which in some examples, includes global navigation satellite system (GNSS) repeaters, a roadside unit (RSU), an infrastructure processor, and infrastructure sensors. The GNSS repeater includes antennas disposed at a repeater module. Accordingly, the PORD system 114 may include various components (e.g., transceivers, processor circuits, memory circuits, routers, and/or input/output interface hardware) for performing the operations described herein, such as, steering angle calibration and wheel alignment.

In some examples, the repeater module replicates GNSS signals obtained from a GNSS satellite via the antennas using known GNSS replication routines and broadcasts, via the infrastructure processor and the RSU, the replicated GNSS signals to the vehicles. The replicated signals may indicate time synchronization information.

The infrastructure sensor component 106 may include image sensors that provide pose, routing, and obstacle data of the manufacturing environment to the infrastructure processor. In some examples, the infrastructure sensor component 106 is provided on an infrastructure element within the manufacturing environment, such as a tower, a light pole, a building, a sign, among other fixed elements of the manufacturing environment. In some examples, the infrastructure sensor component 106 is disposed on a moveable element within the manufacturing environment, such as an unmanned aerial vehicle (UAV). The infrastructure sensor component 106 may include, but is not limited to, a two-dimensional (2D) camera, a three-dimensional (3D) camera, an infrared sensor, a radar scanner, a laser scanner, a light detection and ranging (LIDAR) sensor, an ultrasonic sensor, among other types of sensors that generate pose, routing, and obstacle data.

The RSU is equipped with a cellular vehicle-to-infrastructure communication system (referred to as "CV2X systems"). The roadside unit is configured to broadcast, for example, the infrastructure sensor data to the vehicle 102 via one or more wireless communication protocols, such as a CV2X protocol, a private and/or public cellular protocol, a Wi-Fi protocol, a long range (LoRA) signal protocol, a Bluetooth protocol, and/or a UWB protocol, among others.

The vehicle 102 includes a vehicle driver assistance module 304 having an SWA calibration component 306, a vehicle communication module 308 (e.g., a transmission control unit (TCU)), vehicle controls 310, a vehicle infotainment system 312, a vehicle controller area network (CAN) bus 314, and the onboard sensors 204. The vehicle communication module 308 in some examples includes or is in communication with one or more sensors that are configured to gather data and send signals to other components of the vehicle 102. The one or more sensors of the wireless transmission module 314 may include a vehicle speed sensor (not shown) configured to determine a current speed of the vehicle 102; a wheel speed sensor (not shown) configured to determine if the vehicle 102 is traveling at an incline or a decline; a throttle position sensor (not shown) determines if a downshift or upshift of one or more gears associated with the vehicle 102 is required in a current status of the vehicle 102; and/or a turbine speed sensor (not shown) configured to send data associated with a rotational speed of a torque converter of the vehicle 102. The wireless transmission module 314 communicates information, gathered by the one or more sensors, to the vehicle driver assistance module 306, which also received steering pinion angle offset information 316 from the on-board sensors 204, and performs SWA calibration as described in more detail herein, which may utilize the vehicle controls 310 to control operation of the vehicle 102.

In some examples, the vehicle driver assistance module 306 utilizes the SWA calibration component 306 (e.g., a SWA calibration processor) to process and send information gathered by the one or more sensors to the infrastructure system 104. As another example, the vehicle 102 utilizes vehicle driver assistance module 306 to process and send information gathered by the one or more sensors to the cloud 302 directly. The vehicle driver assistance module 306 is configured to communicate information and/or instructions to the vehicle communication module 308 received from the infrastructure system 104 and/or the vehicle manufacturing cloud 302.

The vehicle infotainment system 310 is a system that delivers a combination of information and entertainment content and/or services to a user of the vehicle 102. It is understood that the vehicle infotainment system 310 can deliver only entertainment content to the user of the vehicle 102, in some examples. It is also understood that the vehicle infotainment system 310 can deliver information services to anyone associated with the vehicle 102, in other examples. As an example, the vehicle infotainment system 310 includes built-in car computers that combine one or more functions, such as digital radios, built-in cameras, and/or televisions. The vehicle infotainment system 310 communicates information associated with the built-in car computers or processors to the vehicle driver assistance module 304. For example, the vehicle 102 utilizes the vehicle driver assistance module 304 to process and send information received from the vehicle infotainment system 310 to the infrastructure system 104.

The one or more on-board sensors 204 may be various types of vehicle sensors, such as one or more of cameras, lidar, radar, and/or ultrasonic devices. For example, ultrasonic devices utilized as the one or more on-board sensors 204 emit a high frequency sound wave that hits an object (e.g., a wall or another vehicle) and is then reflected back to the vehicle 102. Based on the amount of time it takes for the sound wave to return to the vehicle 102, the vehicle 102 can determine the distance between the one or more on-board sensors 204 and the object. As another example, camera devices utilized as the one or more on-board sensors 204 provide a visual indication of a space around the vehicle 102. As an additional example, radar devices utilized as the one or more on-board sensors 204 emit electromagnetic wave signals that hit the object and is then reflected back to the vehicle 102. Based on the amount of time it takes for the electromagnetic waves to return to the vehicle 102, the vehicle 102 can determine a range, velocity, and angle of the vehicle 102 relative to the object.

The on-board sensors 204 are configured to generate vehicle sensor data corresponding to detected objects surrounding the vehicle. As an example, the one or more on-board sensors 204 are provided by image sensors (e.g., a 2D camera, a 3D camera, an infrared sensor, a radar scanner, a laser scanner, a LIDAR sensor, an ultrasonic sensor, among others). As another example, the one or more on-board sensors 204 include a steering wheel position/steering wheel angle sensor that is configured to generate data indicative of a steering wheel angle and/or a steering pinion angle offset during the WAHA routine as described in more detail herein.

The one or more on-board sensors 204 communicate information associated with the position and/or distance at which the vehicle 102 is relative to the object. For example, the vehicle 102 utilizes the vehicle driver assistance module 304 to process and send information received from the one or more on-board sensors 204 to the infrastructure system 104. As another example, the vehicle 102 utilizes the vehicle driver assistance module 304 to process and send information received from the one or more on-board sensors 204 to the cloud 302 directly. The smart marshaling algorithm 306 is configured to communicate information and/or instructions to the one or more vehicle sensors 320 received from the infrastructure system 104 and/or the vehicle manufacturing cloud 302, such as vehicle start-up/shut-down information.

It should be noted that the cloud 302 in some examples includes a vehicle start-up/shut-down module 318 (hereinafter referred to as "the vehicle SS module"). The vehicle SS module 318 may perform an onboarding routine, which includes transmitting a wake-up command to the vehicle 102, which is configured to turn on and connect to the infrastructure system in response to the wake-up command. As such, the vehicle 102 may initiate an autonomous marshaling routine to autonomously navigate to a WAHA EOL process station 130, as described below in further detail. The cloud 302 may include controllers, computing devices, servers, modems, and/or other components for performing the various functions described herein.

The vehicle communication module 308 includes a GNSS receiver 320 configured to provide communication (e.g., wireless communication) with the infrastructure system 104 and the cloud 302. For example, the GNSS receiver 320 is configured to provide communication using a CV2X OBU module 322 and/or a Cellular-Uu module 324 (e.g., communicate using CV2X or cellular communication protocols). In various example, the CV2X OBU module 322 is configured to establish a CV2X communication interface with the infrastructure system 104 and the Cellular-Uu module 324 is configured to establish a cellular communication interface with the cloud 302. In one example, the GNSS receiver 320 includes a GNSS sensor configured to generate a GNSS coordinate of the vehicle 102, but it should be understood that other types of location sensors may be employed to generate the location data, such as an indoor positioning system-based sensor.

In some examples, the GNSS receiver 320 is configured to communicate with satellites so that the vehicle 102 can determine a specific location of the vehicle 102. The GNSS receiver 320 in various examples communicates geographical information associated with the vehicle 102 to one or more components within or outside of the vehicle 102. For example, the vehicle 102 utilizes the vehicle driver assistance module 304 process and send information received from the GNSS receiver 320 to the infrastructure system 104. As another example, the vehicle 102 utilizes the vehicle driver assistance module 304 to process and send information from the GNSS receiver 320 to the vehicle cloud 302 directly. The vehicle driver assistance module 304 is configured to communicate information and/or instructions to the GNSS receiver 302 received from the infrastructure system 104 and/or the cloud 302. As another example, the vehicle 102 utilizes the vehicle driver assistance module 304 to process and send information associated with vehicle navigation maps to the infrastructure system 104. As another example, the vehicle 102 utilizes the vehicle driver assistance module 304 to process and send information from the vehicle navigation maps to the cloud 302 directly. The vehicle driver assistance module 304 is configured to communicate information and/or instructions to the vehicle navigation maps received from the infrastructure system 104 and/or the cloud 302. In some examples, the vehicle navigation maps include vehicle marshaling maps (stored, e.g., in a database).

In some examples, the vehicle driver assistance module 304 is configured to perform the autonomous marshaling routine based on the commands received from the infrastructure system 104 and/or the detected objects (as indicated by the one or more on-board sensors 204). As an example, the vehicle driver assistance module 304 (and/or the infrastructure system 104) is configured to perform an autonomous marshaling routine such that vehicle 102 drives through the WAHA and SWA station, as described below in further detail. Additionally, the vehicle driver assistance module 304 is configured to predict the SWA and align the wheels, as described below in further detail.

In operation, the infrastructure system 104 (e.g., one or more processors of the infrastructure system 104) is configured to control one or more autonomous marshaling routines (e.g., an autonomous navigation routine) performed by the vehicle 102 based on infrastructure sensor data. In some examples, the infrastructure system 104 is configured to perform perception and path planning routines based on the infrastructure sensor data (e.g., pose, routing, and/or obstacle data). As an example, the infrastructure system 104 is configured to broadcast a command to not enter a given area of the manufacturing environment during the autonomous marshaling routine when the infrastructure sensor data indicates a presence of an obstacle within the predefined area. As another example, the infrastructure system 104 is configured to broadcast a command to autonomously marshal the vehicle to the WAHA EOL process station 130 to perform wheel alignment and steering wheel angle routines, as described in more detail herein. It should be understood that the infrastructure processor may control the one or more autonomous marshaling routines in conjunction with one or more components of the vehicle 102.

Figure 4:
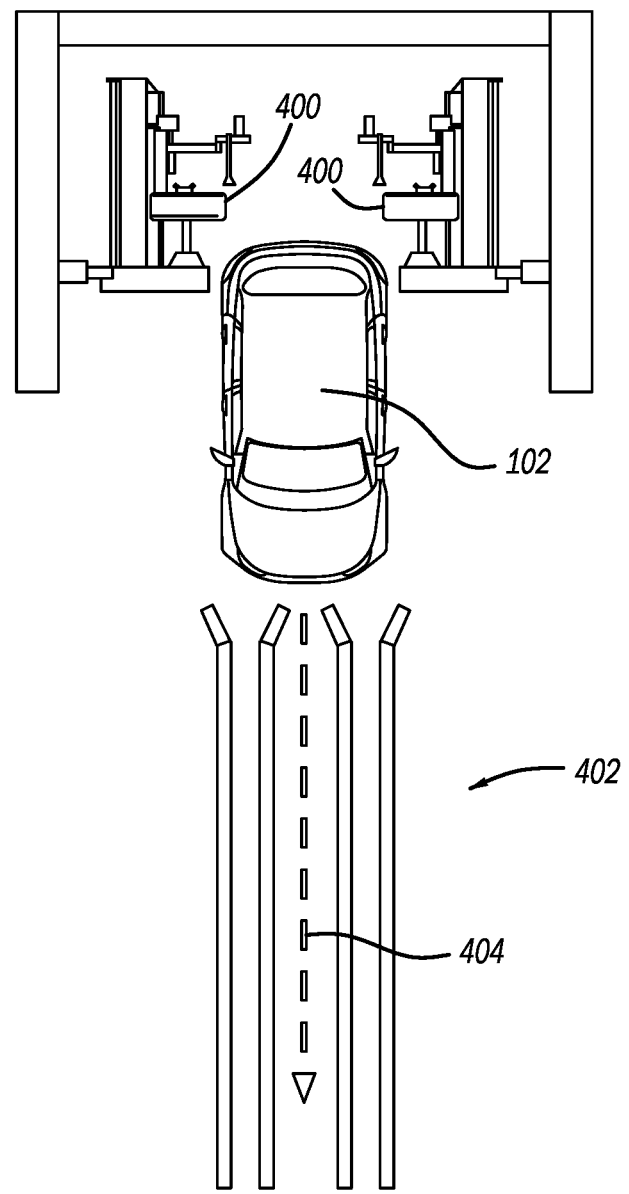
FIG. 4 is a block diagram of a steering wheel alignment system in accordance with various implementations.

Referring to FIG. 4, a system for steering wheel alignment, such as aligning the wheels and estimating a steering wheel angle of the vehicle 102 upon installation of tires 400 of the vehicle 102 is shown. The vehicle 102 and/or the infrastructure system 104 perform the autonomous marshaling routines to navigate the vehicle into a funnel-type wheel alignment system 402 (hereinafter referred to as "the FTWAS") that orients the wheels 400 in a given direction as the vehicle moves through the FTWAS 402 at a given speed and for a given distance.

As the vehicle 102 moves through the FTWAS 402, the vehicle driver assistance module 304 determines the vehicle steering pinion angle offset (while power steering is engaged) based on the steering wheel angle/position sensor data (such as steering pinion angle offset information 316 acquired by the on-board sensors 204) and identifies a center rack of travel. As such, the vehicle driver assistance module 304 determines a deviation between a rack center 404 of the FTWAS 402 based on the steering pinion angle to provide coarse calibration. As an example, the steering pinion angle offset is averaged over time as the vehicle 102 moves to converge the steering pinion angle offset to a nominal value.

Furthermore, as the vehicle moves 102 through the FTWAS 402, the structure (e.g., alignment bars) of the FTWAS 402 simultaneously aligns the wheels 400 (e.g., adjusts the orientation of the wheels 400+/−5 degrees). The vehicle driver assistance module 304 broadcasts the steering pinion angle offset and the amount/type of wheel alignment to the infrastructure system 104 in some examples, which in turn adjusts the one or more autonomous marshaling routines to accommodate for the steering pinion angle offset and the amount/type of wheel alignment. As such, when the infrastructure system 104 autonomously marshals the vehicles 102 to the WAHA station 130, the vehicle 102 may perform conventional external angle calibration methods for calibrating the steering wheel angle and toe alignment via pits underneath the vehicle 102. Furthermore, the vehicle 102 and/or the infrastructure system 104 can perform the autonomous marshaling features with enhanced accuracy by accounting for the steering pinion angle offset and the amount/type of wheel alignment when determining routes, trajectories, and/or velocities of the vehicles 102.

Figure 5:
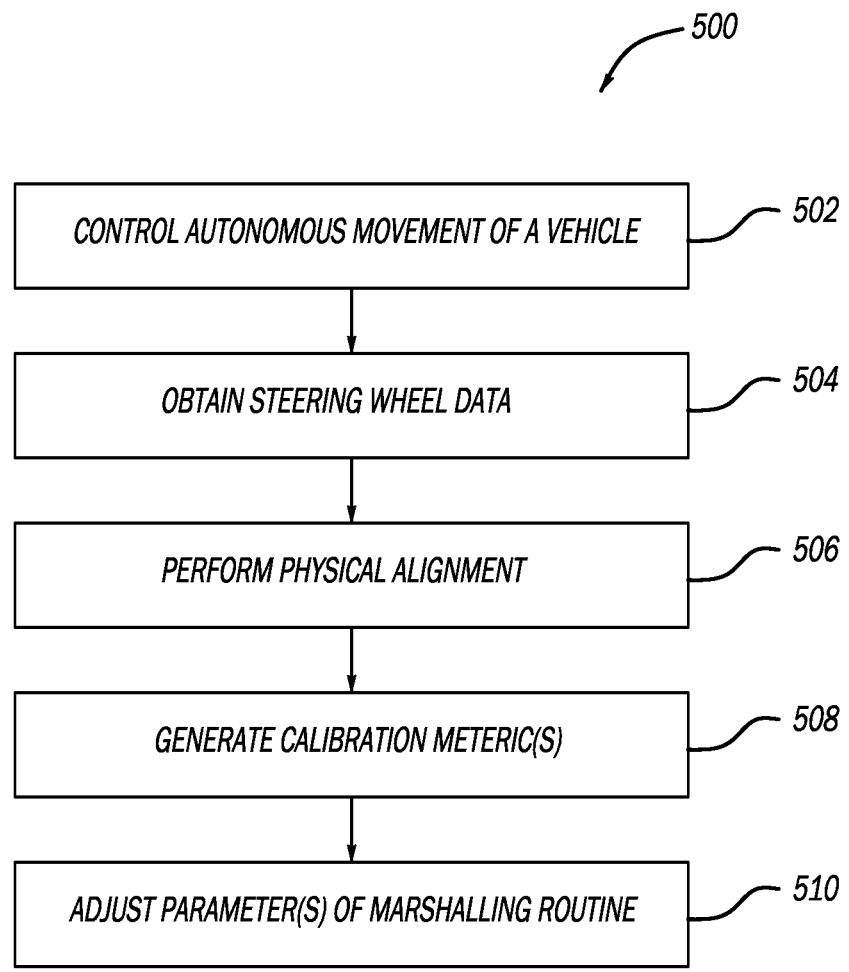
FIG. 5 is a flowchart of an example method calibrating a steering angle of a vehicle in accordance with various implementations.

FIG. 5 is a flow chart illustrating an example method 500 for calibrating a steering angle of a vehicle (e.g., the vehicle 102) in accordance with various implementations described herein. The method 500 begins at operation 502 with controlling autonomous movement of the vehicle within a wheel alignment system based on an autonomous marshaling routine. For example, the infrastructure system 104 controls the vehicle based on a marshaling routine, such that the vehicle is automatically maneuvered (e.g., between calibration stations) without the aid of a human driver by using sensors mounted in the factory infrastructure to provide real-time accurate vehicle localization, along with wireless communication between the infrastructure and vehicle for closed-loop control without a human porter to drive the vehicle. That is, the vehicle is controlled along a marshaling route from a start-of-line position to an end-of-line position in some examples.

At operation 504, steering wheel angle data is obtained from one or more vehicle sensors of the vehicle. For example, as described in more detail herein, the on-boards sensors 204 (or other sensors of a wheel alignment system) capture data relating to the steering and movement of the vehicle 102. For example, as the vehicle travels through a wheel alignment system, such as a funnel-type wheel alignment system, steering wheel angle data is acquired. In some examples, the vehicle 102 is autonomously maneuvered into the funnel-type wheel alignment system (or the station operator roughly aligns the wheels straight) which pushes the wheels 400 in straight as the wheels 400 begin to move through at a set speed for a set distance. In one or more examples, raw vehicle steering pinion angle offset information 316 is provided to the advanced driver assistance module onboard the vehicle 102 (which identifies the center 404 of rack travel).

At operation 506, a physical alignment of the wheels 400 of the vehicle 102 is performed in some examples. The physical alignment can be performed automatically, semi-automatically, or manually. As such, a physical alignment of one or more wheels 400 of the vehicle 102 is performed as the vehicle 102 moves through the funnel-type wheel alignment system. It should be noted that the physical alignment can be performed using any suitable wheel alignment process or routine. As should be appreciated, the physical alignment in various examples is a coarse physical alignment of the wheels 400 to allow for maneuvering of the vehicle 102 using the wheels 400.

At operation 508, one or more calibration metrics are generated based on the vehicle steering pinion angle offset and the physical alignment. For example, the coarse physical alignment of wheels 400 in combination with the steering pinion angle offset information allows for providing a learning offset to an advanced driver assistance system (ADAS), which includes the vehicle driver assistance module 304 in some examples. The ADAS is configured to align the wheels to +/−5 degrees for maneuvering in some examples. It should be noted that in some examples, the steering wheel angle coarse calibration information and toe information is stored within the ADAS (such as within the vehicle driver assistance module 304) and provided to the infrastructure system 104 for controlling maneuvering of the vehicle. In one or more examples, the steering wheel angle coarse calibration information and toe information is also transmitted (e.g., cascaded) to the WAHA system 130 for any further manual alignment.

At operation 510, one or more parameters of the autonomous marshaling routine are selectively adjusted based on one or more calibration metrics generated by the wheel alignment system. For example, the infrastructure system 104 adjusts a marshaling routine or route based on the calibration metrics. In some examples, upon maneuvering to the WAHA station 130, a standard or fine-tuning external angle calibration method for steering wheel angle and toe alignment is performed on the vehicle 102 via pits underneath the vehicle 102.

Thus, with one or more examples, automated steering for the AVM is enabled immediately at the end-of-line, after the vehicle tires and wheels have been installed. That is, the coarse alignment of the steering angle to provide vehicle steering angle calibration is performed prior to the WAHA station 130 to allow driving the vehicle 102 to such a station for fine-tuned calibration and adjustment, in addition to potential offshoot maneuvering to repair bays. In some examples, the wheels are aligned and a coarse estimate of the vehicle's steering angle is provided upon installation of the tires, thereby leveraging a funnel-type mechanism coupled with prior calibrated raw information on the vehicle's steering pinion angle offset.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system comprising:
a funnel-type wheel alignment system; and
an infrastructure system, wherein:
the infrastructure system is configured to:
autonomously control a movement of the vehicle within the funnel-type wheel alignment system based on an autonomous marshaling routine; and
selectively adjust one or more parameters of the autonomous marshaling routine based on one or more calibration metrics generated by the funnel-type wheel alignment system; and
the funnel-type wheel alignment system is configured to:
obtain steering wheel angle data from one or more vehicle sensors of the vehicle;
determine a vehicle steering pinion angle offset based on the steering wheel angle data;
perform a physical alignment of one or more wheels of the vehicle as the vehicle moves through the funnel-type wheel alignment system;
generate the one or more calibration metrics based on the vehicle steering pinion angle offset and the physical alignment; and
broadcast the one or more calibration metrics to the infrastructure system.

2. The system of claim 1, wherein the funnel-type wheel alignment system is further configured to transmit information relating to the vehicle steering pinion angle offset to an advanced driver assistance system (ADAS) onboard the vehicle to identify a center of rack travel.

3. The system of claim 2, wherein the vehicle steering pinion angle offset is determined while power steering of the vehicle is engaged, and the ADAS determines a deviation from the center of rack travel to perform coarse calibration.

4. The system of claim 3, wherein the vehicle steering pinion angle offset is averaged over time as the vehicle moves to converge the steering pinion angle offset to a nominal value.

5. The system of claim 3, wherein steering wheel angle coarse calibration information from the coarse calibration and toe information for the vehicle are stored in the ADAS and transmitted to the infrastructure system, wherein the infrastructure system is further configured to use the transmitted information to control maneuvering of the vehicle including adjusting one or more autonomous marshaling routines.

6. The system of claim 3, wherein steering wheel angle coarse calibration information from the coarse calibration and toe information for the vehicle are stored in the ADAS and transmitted to a wheel alignment and headlamp aim system for use in manual alignment.

7. The system of claim 2, wherein the vehicle transmits a raw vehicle steering pinion angle offset signal to the ADAS to compute a nominal calibration offset value.

8. The system of claim 1, wherein the funnel-type wheel alignment system is further configured to perform the physical alignment of the one or more wheels of the vehicle by simultaneously aligning the one or more wheels of the vehicle.

9. A method comprising:
controlling autonomous movement of a vehicle within a wheel alignment system based on an autonomous marshaling routine;
obtaining steering wheel angle data from one or more vehicle sensors of the vehicle;
determining a vehicle steering pinion angle offset based on the steering wheel angle data;
performing a physical alignment of one or more wheels of the vehicle as the vehicle moves through the wheel alignment system;
generating one or more calibration metrics based on the vehicle steering pinion angle offset and the physical alignment; and
selectively adjusting one or more parameters of the autonomous marshaling routine based on the one or more calibration metrics generated by the wheel alignment system.

10. The method of claim 9, further comprising transmitting information relating to the vehicle steering pinion angle offset to an advanced driver assistance system (ADAS) onboard the vehicle to identify a center of rack travel.

11. The method of claim 10, wherein the vehicle steering pinion angle offset is determined while power steering of the vehicle is engaged, and the ADAS determines a deviation from the center of rack travel to perform coarse calibration.

12. The method of claim 11, wherein the vehicle steering pinion angle offset is averaged over time as the vehicle moves to converge the steering pinion angle offset to a nominal value.

13. The method of claim 11, further comprising storing steering wheel angle coarse calibration information from the coarse calibration and toe information for the vehicle in the ADAS and using the transmitted information to control maneuvering of the vehicle including adjusting one or more autonomous marshaling routines.

14. The method of claim 11, further comprising storing the steering wheel angle coarse calibration information from the coarse calibration and toe information for the vehicle in the ADAS and transmitting the information to a wheel alignment and headlamp aim system for use in manual alignment.

15. The method of claim 10, wherein the vehicle transmits a raw vehicle steering pinion angle offset signal to the ADAS to compute a nominal calibration offset value.

16. The method of claim 9, wherein the wheel alignment system comprises a funnel-type wheel alignment system and further comprising performing the physical alignment of the one or more wheels of the vehicle by simultaneously aligning the one or more wheels of the vehicle.

17. One or more non-transitory computer-readable media storing processor-executable instructions that, when executed by at least one processor, cause the at least one processor to:
control, by an infrastructure system, autonomous movement of a vehicle within a wheel alignment system based on an autonomous marshaling routine;
obtain steering wheel angle data from one or more vehicle sensors of the vehicle;
determine, by the wheel alignment system, a vehicle steering pinion angle offset based on the steering wheel angle data;
perform, by the wheel alignment system, a physical alignment of one or more wheels of the vehicle as the vehicle moves through the wheel alignment system;
generate, by the wheel alignment system, one or more calibration metrics based on the vehicle steering pinion angle offset and the physical alignment;
broadcast the one or more calibration metrics to the infrastructure system; and
selectively adjust, by the infrastructure system, one or more parameters of the autonomous marshaling routine based on the one or more calibration metrics generated by the wheel alignment system.

18. The one or more non-transitory computer-readable media of claim 17, wherein the wheel alignment system comprises a funnel-type wheel alignment system and the processor-executable instructions, when executed by the at least one processor, cause the funnel-type wheel alignment system to transmit information relating to the vehicle steering pinion angle offset to an advanced driver assistance system (ADAS) onboard the vehicle to identify a center of rack travel, wherein the vehicle steering pinion angle offset is determined while power steering of the vehicle is engaged, and the ADAS determines a deviation from the center of rack travel to perform coarse calibration.

19. The one or more non-transitory computer-readable media of claim 18, wherein the vehicle steering pinion angle offset is averaged over time as the vehicle moves to converge the steering pinion angle offset to a nominal value.

20. The one or more non-transitory computer-readable media of claim 18, wherein the processor-executable instructions, when executed by the at least one processor, cause the vehicle to store steering wheel angle coarse calibration information from the coarse calibration and toe information for the vehicle in the ADAS and transmit the information to the infrastructure system, and cause the infrastructure system to use the transmitted information to control maneuvering of the vehicle including adjusting one or more autonomous marshaling routines.

* * * * *